(12) United States Patent
Shen

(10) Patent No.: US 6,670,779 B2
(45) Date of Patent: Dec. 30, 2003

(54) HIGH POWER FACTOR ELECTRONIC BALLAST WITH LOSSLESS SWITCHING

(75) Inventor: Eric B. Shen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/011,620

(22) Filed: Dec. 5, 2001

(65) Prior Publication Data

US 2003/0102818 A1 Jun. 5, 2003

(51) Int. Cl.[7] .................................................. G05F 1/00
(52) U.S. Cl. ........................................... 315/291; 307/64
(58) Field of Search ............................ 315/209 R, 219, 315/291, 247; 363/24, 34, 37, 39, 55, 56; 307/64, 82

(56) References Cited

U.S. PATENT DOCUMENTS

| | | | |
|---|---|---|---|
| 3,641,356 A | * | 2/1972 | Ekstrom ..................... 307/64 |
| 5,245,520 A | * | 9/1993 | Imbertson .................. 363/56 |
| 5,353,212 A | | 10/1994 | Loftus, Jr. .................. 363/17 |
| 5,434,767 A | | 7/1995 | Batarseh et al. ............ 363/16 |
| 5,446,366 A | | 8/1995 | Bassett et al. .............. 323/222 |
| 5,636,114 A | | 6/1997 | Bhagwat et al. ............ 363/56 |
| 5,912,812 A | | 6/1999 | Moriarty, Jr. ............... 363/89 |
| 6,225,755 B1 | | 5/2001 | Shen .......................... 315/247 |
| 6,266,257 B1 | * | 7/2001 | Geissler ..................... 363/55 |
| 6,552,500 B1 | * | 4/2003 | Tyson ........................ 315/291 |

* cited by examiner

Primary Examiner—Don Wong
Assistant Examiner—Jimmy T Vu

(57) ABSTRACT

An electronic converter receiving low frequency input power, converting this power to DC power at a voltage greater than the input voltage peak, and providing output power from a commutator stage. Lossless switching of the power semiconductor devices in the input stage is achieved by turning each device on at an instant when voltage across the device's current terminals is zero. Current through a main inductor of the input circuit is triangular and substantially unidirectional for at least a few high frequency cycles. To ensure lossless switching, current through the main inductor of the input circuit may be reversed briefly before switching. For use as an electronic arc lamp ballast, the commutator stage also uses lossless switching, and substantially unidirectional triangular current through an output inductor is reversed periodically.

20 Claims, 10 Drawing Sheets

HIGH POWER FACTOR ELECTRONIC BALLAST WITH LOSSLESS SWITCHING

CROSS-REFERENCE TO RELATED APPLICATIONS

Not Applicable.

STATEMENT REGARDING FEDERALLY SPONSORED RESEARCH OR DEVELOPMENT

Not Applicable

BACKGROUND OF THE INVENTION

1. Field of the Invention

The invention relates to electronic converter circuits which receive low frequency input power, convert it to DC power at a voltage greater than the peak of the input voltage, and provide output power from a full wave or half bridge output converter. Many electronic lamp ballasts are an example of this kind of device.

2. Description of the Related Art

FIG. 1 is a simplified schematic diagram of a prior art converter having separate stages for each function. A boost converter 11 provides power factor correction on the input current, and has a DC output higher than the peak output from a conventional full wave rectifier 12. An EMI filter 13 blocks high frequency noise from the boost converter from conducting back to the input power line. A down converter 14 matches the boost converter output to the desired level for the input to a full bridge load commutator or inverter 15. A controller 16 controls the switching frequency or times in the boost converter to maintain the input current as sinusoidal as possible, a controller 17 adjusts switching in the down converter responsive to the current drawn by the load commutator or inverter, and a controller 18 sets the commutator 15 frequency and/or switching times to suit the load needs.

FIG. 2 is a schematic diagram of a high power factor converter having a simplified circuit known from U.S. Pat. No. 6,225,755 by the inventor herein. The output converter of this patent does not operate like a typical inverter, in which the output devices switch on and off alternately. Rather, one output power switching device HF3 is switched alternately on and off according to a high frequency pulse width modulated arrangement for a specifiable period of time, and then the other output power switching device HF4 is similarly switched for the specifiable period of time so that the voltage across capacitor C2 at the output is a low frequency square wave. This converter is therefore suitable for driving a high intensity discharge (HID) lamp which preferably should not be driven at a frequency in the range of tens of kilohertz.

U.S. Pat. No. 6,225,755 does not expressly describe the current and voltage switching conditions of the input switches HF1 and HF2, and the output switches HF3 and HF4. Rather, the input switches are described as controlled at a high frequency pulse width modulation arrangement to shape the input inductor current to be in phase with the mains voltage signal, while the output switches are controlled at a high frequency pulse width modulated arrangement to shape the current signal flowing through inductor L2 as a low frequency square wave. The frequency at which the output switches are operated may be a specified frequency. During one output polarity of the square wave, one of the output switches has a high frequency duty cycle chosen to produce a desired average voltage across the other switch, which is deactivated for that half cycle.

One of ordinary skill will understand that, when the input converter is operated under the continuous conduction mode (CCM), the switches are operated such that during a high frequency switching cycle, the inductor current remains continuous, never reaching zero. The current still ramps up linearly and down linearly, but this high frequency component is usually very small compared to the average value of the inductor current.

When the ballast is operated in the discontinuous conduction mode (DCM), the switches are operated such that during a high frequency cycle, the inductor current first ramps up linearly and then down linearly to zero. The current then remains at zero for a period of time before the high frequency switching cycle restarts. This mode of operation is normally used when the switching frequency is fixed to a constant value.

The critical discontinuous conduction mode (CDCM) is the boundary between CCM and DCM. The switches are operated such that the inductor current first ramps up, then ramps down to zero. When the current reaches zero, the switching cycle immediately repeats. Switching depends on the inductor current boundaries, so the switching frequency will depend on the operating conditions of the converter and will vary with these conditions.

BRIEF SUMMARY OF THE INVENTION

An object of the invention is to provide an electronic converter which has improved efficiency because of lossless switching of power semiconducting devices.

Another object of the invention is to provide an electronic converter with a reduced parts count.

A further object of the invention is to provide an electronic lamp ballast having a controllable low to moderate frequency output, which has improved efficiency.

According to the invention, converter efficiency is improved through the use of lossless switching of the power devices in the input stage. The input stage receives low frequency input power and converts this into DC power having a voltage higher than the peak voltage of the low frequency power. Preferably, the converter also has lossless switching of an inverter stage which converts the DC power to output power having a high frequency component.

In this context, lossless switching requires that the voltage across the device's current terminals must be substantially zero at the time when the device is turned on. Whenever this voltage is not zero, energy is stored in the output capacitance of the switch; if the switch is turned on while that energy is stored, the output capacitance energy is discharged into the switch, and this represents a loss of energy. To produce lossless switching, the main inductor current is used to charge and discharge the switch output capacitances so that the switches can always be turned on at zero voltage. To ensure that switching is lossless, the inductor current may be caused to reverse briefly before switching, thereby removing stored charge in the output capacitance.

An input stage according to the invention provides DC power to negative and positive DC buses. Two input power-switching devices having a switch node between them are connected in series between upper and lower signal lines. A capacitive divider having an intermediate connection is also connected between these signal lines. A boost inductor is connected between the switch node and the intermediate connection. One of the signal lines is connected directly to one of the DC buses, while the other signal line is connected to the other DC bus through a current-sensing resistor.

An output converter stage according to the invention has two buffer capacitors having a switch node between them connected in series between the two DC buses, and also has two converter power switching devices having an output node between them connected in series between these buses. A high frequency inductor through which a load current flows is connected between the switch node and the output node.

Unlike most prior art converters similar to FIG. 1, in each stage the current through the inductor is not sinusoidal, and the circuits are not resonant. Rather, the current through each inductor is triangular and substantially unidirectional for at least a few high frequency cycles. In the input stage the inductor current must go slightly negative; that is, reverse briefly, in order to ensure zero voltage switching while the direction of the triangular pulse is determined by the polarity of the input voltage at that time. This current reversal may be sensed by the current-sensing resistor.

In the inverter stage it is usually not necessary that the current reverse in order to ensure lossless switching. However, if the load is an arc discharge lamp it may be desirable to reverse the current direction periodically.

In a preferred embodiment, the converter is an electronic ballast for an arc discharge lamp. When the output square wave frequency is in the low to mid audio frequencies, this lamp may be an HID lamp. Lamp current is controlled not by changing frequency of an inverter, but by controlling the value of output inductor current at which the inverter switch is turned off. Likewise, the DC voltage is determined by the instant at which the input power switching device is turned off.

DETAILED DESCRIPTION OF THE INVENTION

Figure 1:
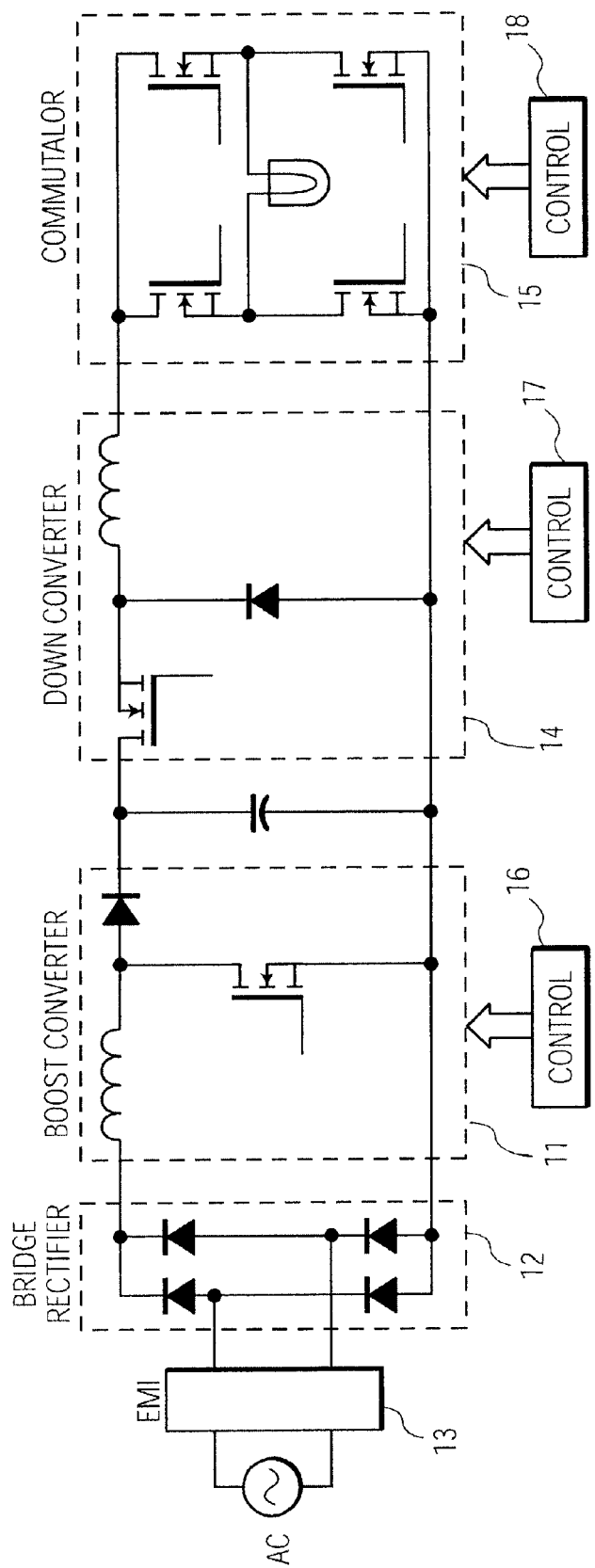
FIG. 1 is a simplified circuit diagram of a prior art converter.
Figure 2:
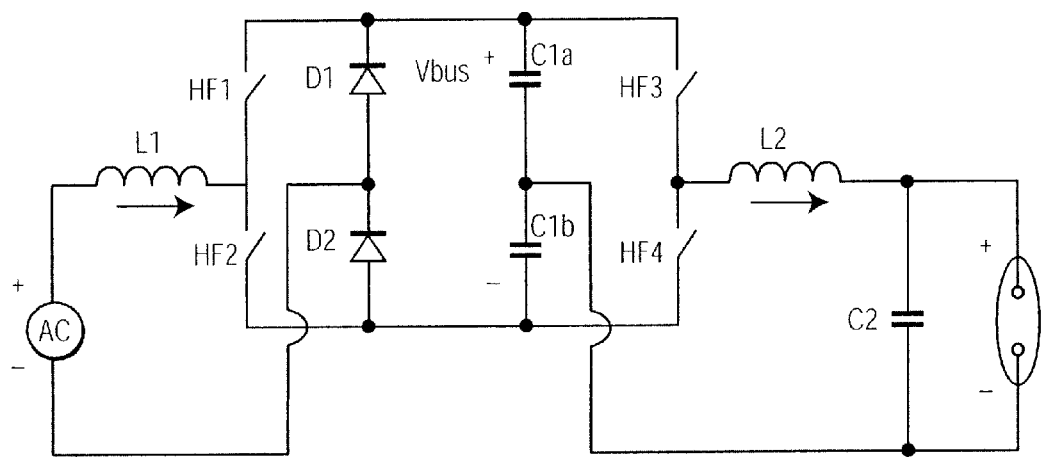
FIG. 2 is a simplified circuit diagram of a high power factor electronic ballast disclosed in U.S. Pat. No. 6,225,755.
Figure 3:
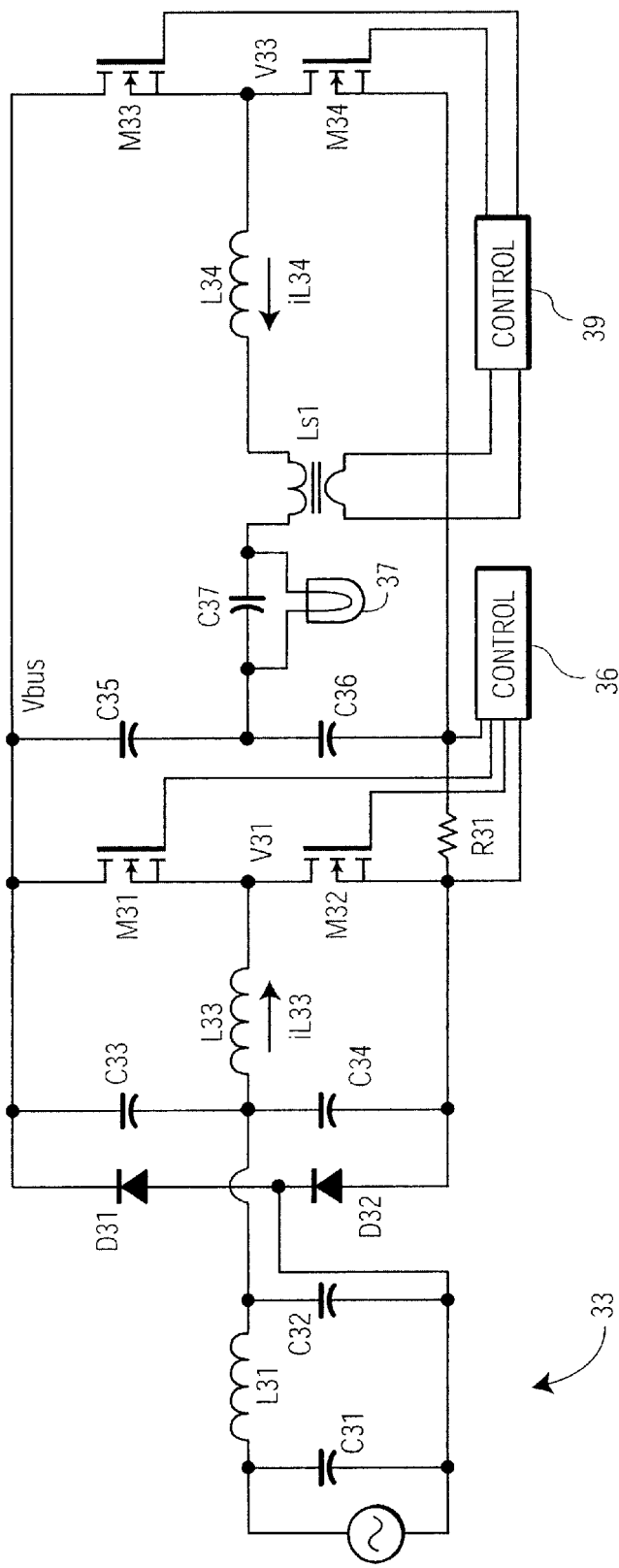
FIG. 3 is a simplified circuit diagram of a high power factor electronic ballast according to the invention.

The circuit topology of FIG. 3 differs from that of U.S. Pat. No. 6,225,755 primarily in the addition of a capacitive divider. This change allows a significantly improved operation in accordance with the invention.

A conventional EMI filter 33 is shown having capacitors C31 and C32 and an inductor L31 in a π configuration, feeding a combination rectifier/boost converter circuit. Through the EMI filter the neutral side of the mains supply is connected to a node between two bridge diodes D31 and D32, while the hot or line voltage side of the mains supply is connected to the center node of a capacitive divider formed by capacitors C33 and C34, and also to the input end of a boost inductor L33, whose other end is connected to an input half bridge formed by switches M31 and M32, which preferably are MOSFETs. The bridge diodes D31, D32, the capacitive divider and the input half bridge are connected between positive and negative signal lines which are respectively connected to a positive DC bus and, through a current-sensing resistor R31, to a negative DC bus. A controller 36 receives inputs from the signal lines and the resistor 31, and provides control signals to the MOSFETs M31 and M32.

Two energy storage capacitors C35 and C36 are connected in series between the positive and negative buses, as are two load switches M33 and M34 forming a commutator half bridge. A lamp load 37, having a filter capacitor C37 in parallel with it, has one end connected to the midpoint between the capacitors C35 and C36, and has the other end connected through a high frequency inductor L34 in series with a small saturable transformer Ls1 to the node between the switches M33 and M34. A controller 39 receives inputs indicative of the presence of significant inductor current, and of lamp voltage and/or current, and provides control signals to the MOSFETs M33 and M34.

Circuit Operation

Boost Converter

Figure 4:
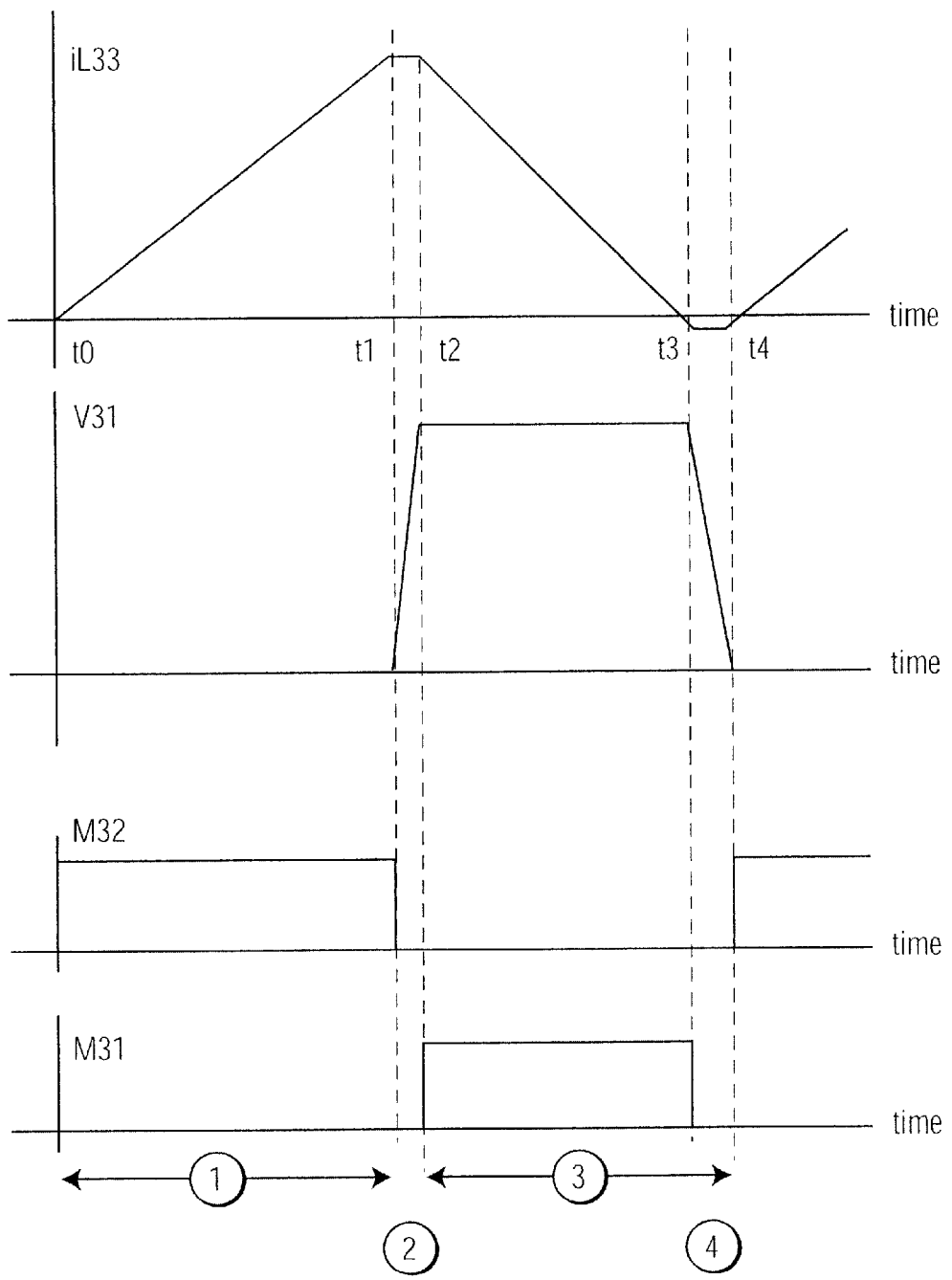
FIG. 4 is a timing diagram showing current through the boost inductor and switching of the input stage switching devices.
Figure 4A:
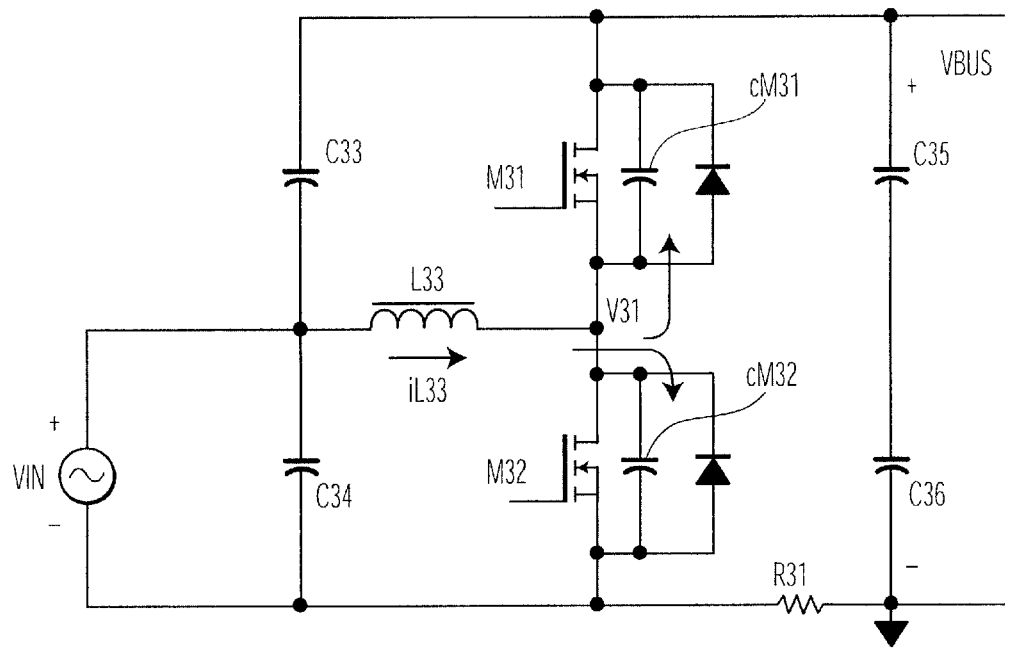
FIGS. 4a and 4b are a simplified diagram of the active circuit parts and enlarged view of current and voltage during the time between t1 and t2 of FIG. 4.
Figure 4B:
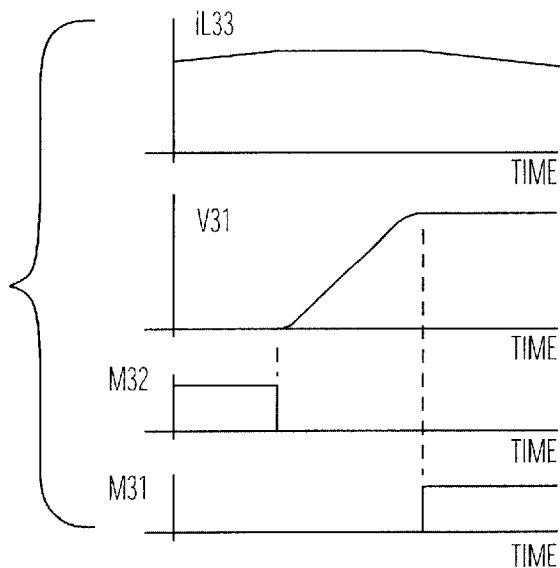
Figure 4C:
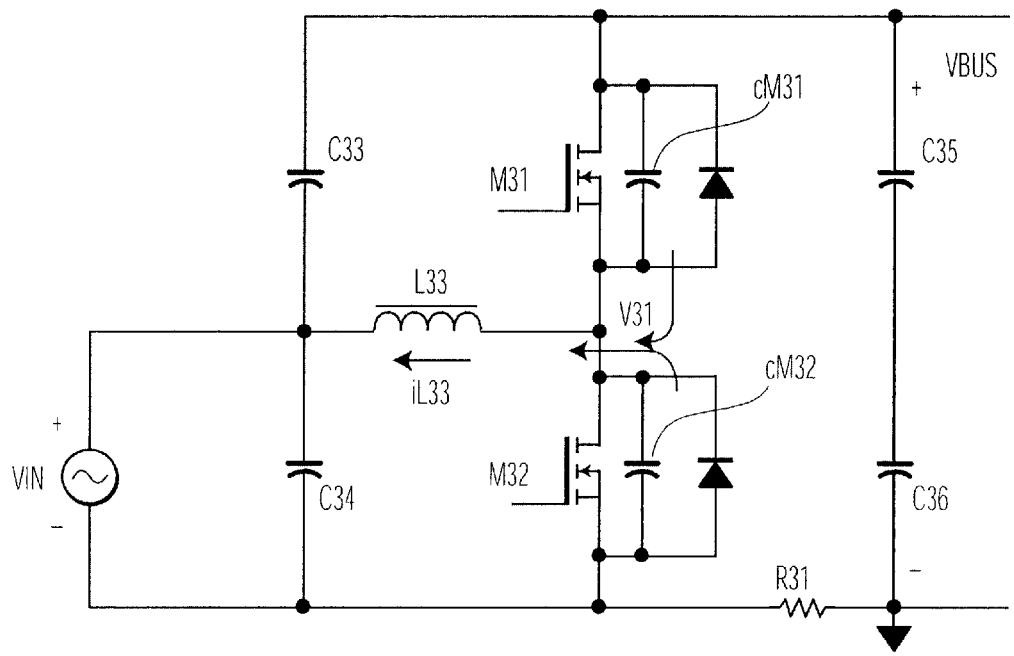
FIGS. 4c and 4d are a simplified diagram of the active circuit parts and enlarged view of current and voltage during the time between t3 and t4 of FIG. 4.
Figure 4D:
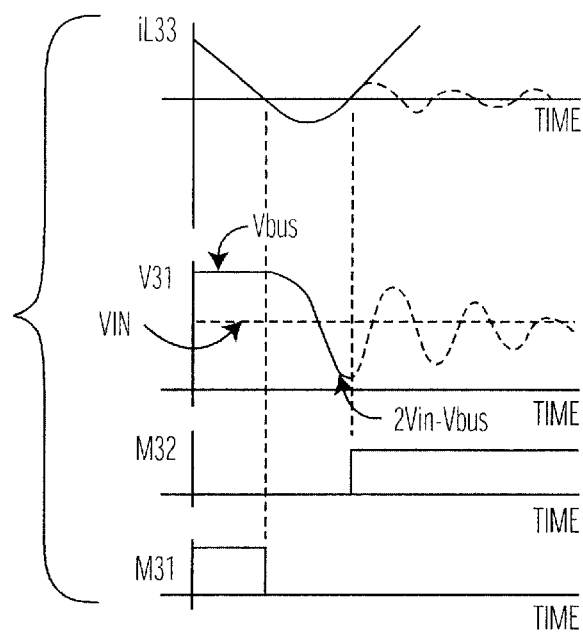
Figure 5:
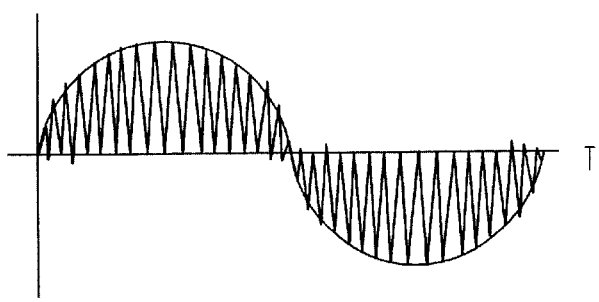
FIG. 5 is a diagram of the boost inductor current over a full cycle of mains voltage.

When the mains voltage is positive the average value of iL33 is positive, and diode D32 is on, so the mains voltage appears across C34. When t0<t<t1 as shown in FIG. 4, M32 is on, iL33 is rising so energy is being stored in L33, and current in R31 is zero. When t2<t<t3, M31 is on, and iL33 is positive but falling, energy is drawn from L33, C35 and C36 are charged and current through R31 is usable to determine t=t3.

Detailed operation of the input stage is readily understood from the basic timing diagram shown in FIG. 4, together with the views of the active circuit parts and current and voltages near the critical switching times as shown in FIGS. 4a–4d. At time t0 input switch M32 is turned on, and current iL33 through boost inductor L33 ramps linearly upwards, rising to a maximum at time t1 when switch M32 is turned off. Current iL33 continues to flow, and charges the parasitic capacitance cM32 of switch M32 while discharging the parasitic capacitance cM31 of switch M31, thereby causing the voltage V31 at the node between the switches to rise from ground to the positive bus potential. When the node voltage reaches the positive bus potential, the capacitance of M31 has been discharged, and iL33 flows through the body diode of M31, clamping the node between M31 and M32 to the positive DC bus voltage. At this time, time t2, switch M31 can be turned on at zero voltage. Current iL33 will then ramp downwards linearly.

When iL33 reaches zero, as detected by the voltage across R31, time t3 has been reached. MOSFET M31 is turned off.

This causes voltage V31 to decrease to a minimum value of 2Vin−Vbus, which is approximately ground voltage. If V31 reaches ground voltage, the body diode of M32 will clamp V31 to ground and M32 can be turned on at zero voltage, starting repetition of the switching cycle. If V31 does not reach ground, M32 can be turned on at the minimum value of V31 which will still reduce losses. Alternatively, if V31 does not reach ground, turn on of M32 can be delayed, causing current iL33 to go further negative. If sufficient energy is stored in boost inductor L33, cM31 will be fully charged and cM32 will be fully discharged. This guarantees that V31 will reach ground so that M32 can be turned on with true zero voltage switching.

When the mains voltage is negative, operation is exactly like that described above, except that the current directions and the operations of the switches reverse, and diode D31 is conducting while D32 is non-conducting.

The above description is independent of the switching and current cycles in the output stage, except that the output voltage and power requirements will determine the amount of boost and the input inductor current.

Commutator Output Circuit

The operation of the output or commutator stage is in many ways analogous to that of the boost converter: the inductor current rises and falls linearly in one direction for one polarity of smoothed output voltage, while for the other polarity the current directions and the operations of the switches reverse. Because of the smoothing capacitor C37, the load voltage and current has no significant component at the switching frequency of the output power switching devices.

Figure 6:
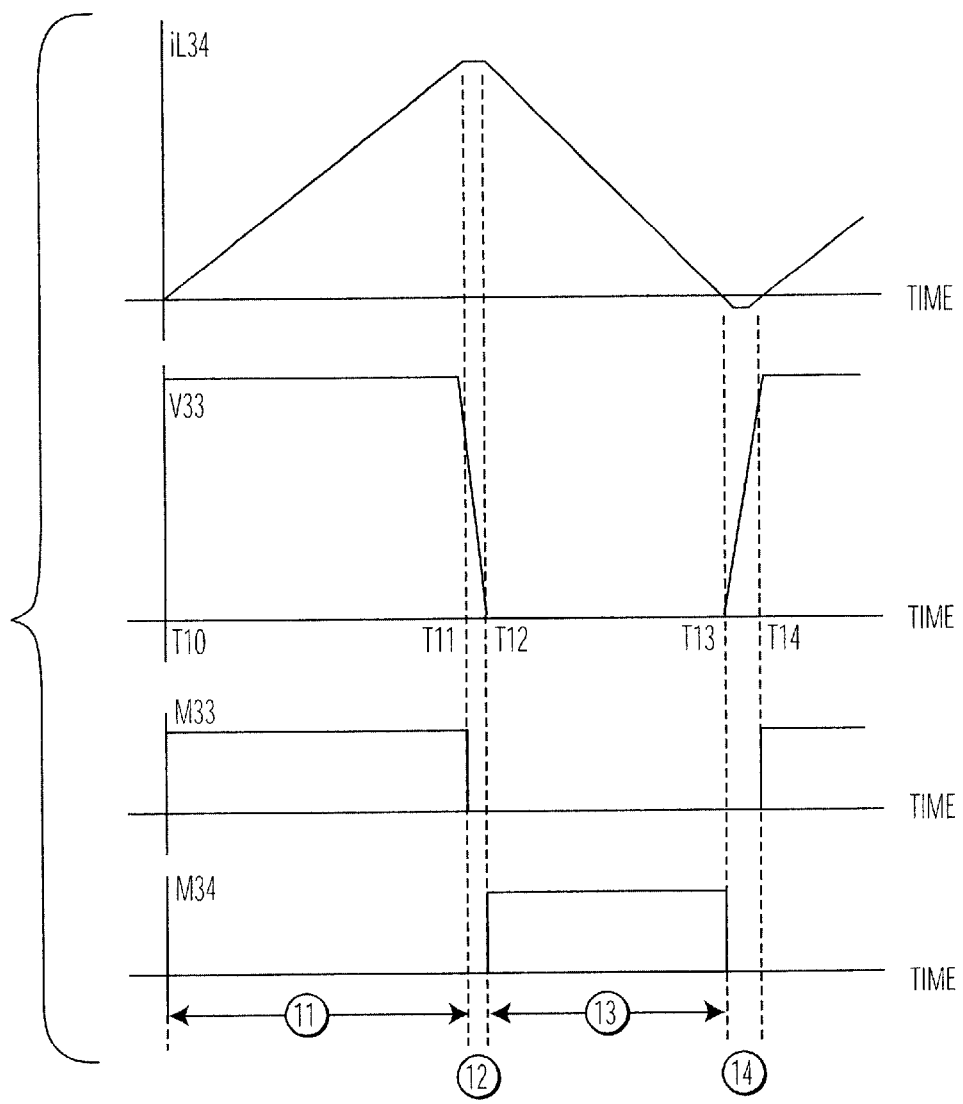
FIG. 6 is a timing diagram showing positive current through the load circuit inductor and switching of the output stage switching devices.
Figure 6A:
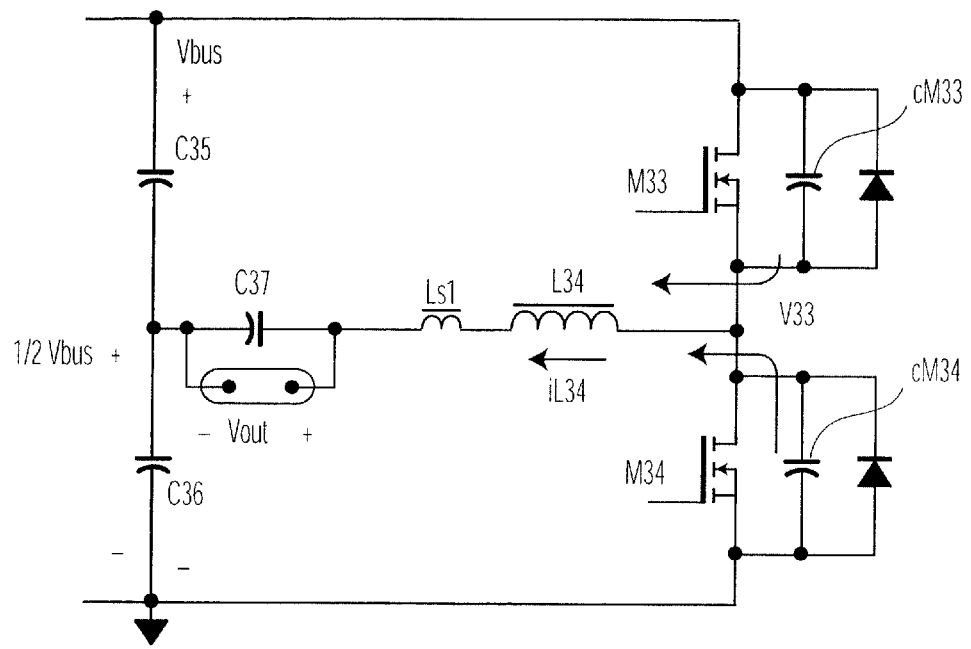
FIGS. 6a and 6b are a simplified diagram of the active circuit parts and enlarged view of current and voltage during the time between t11 and t12 of FIG. 6.
Figure 6B:
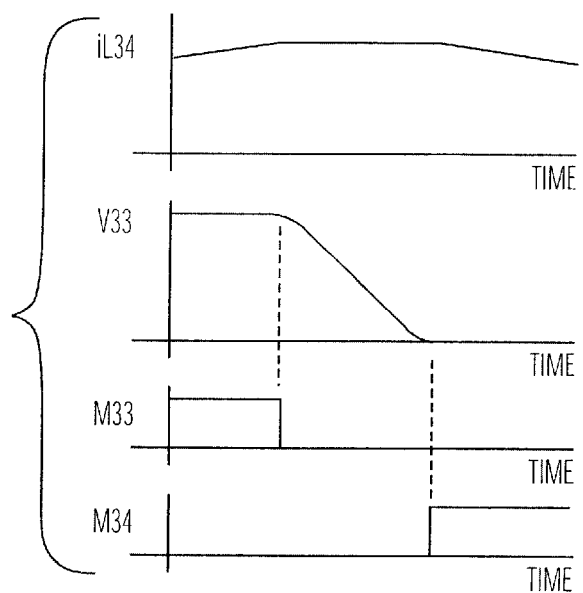
Figure 6C:
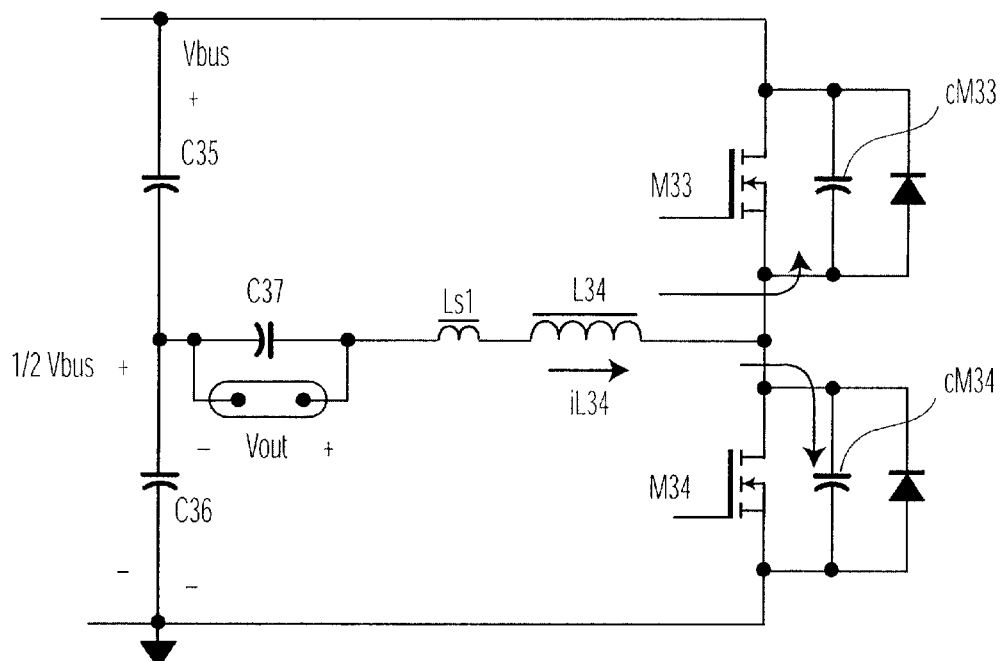
FIGS. 6c and 6d are a simplified diagram of the active circuit parts and enlarged view of current and voltage during the time between t13 and t14 of FIG. 6.
Figure 6D:
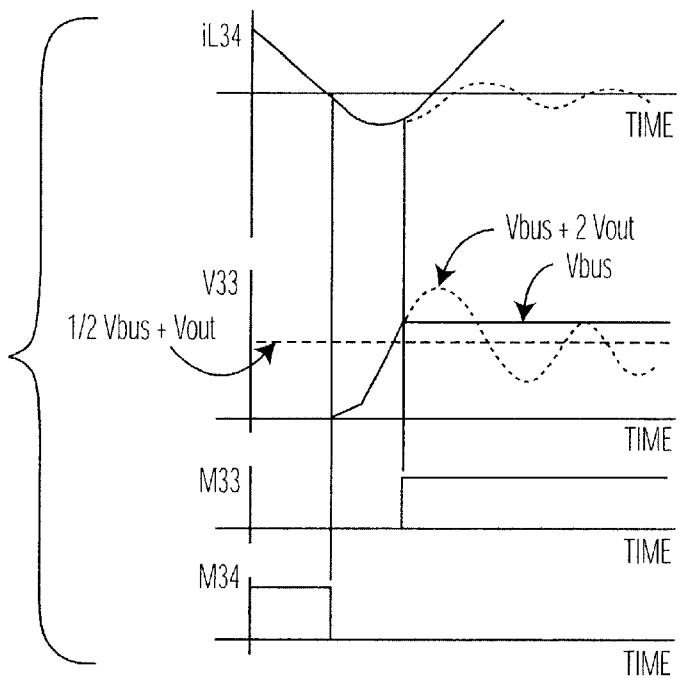
Figure 7:
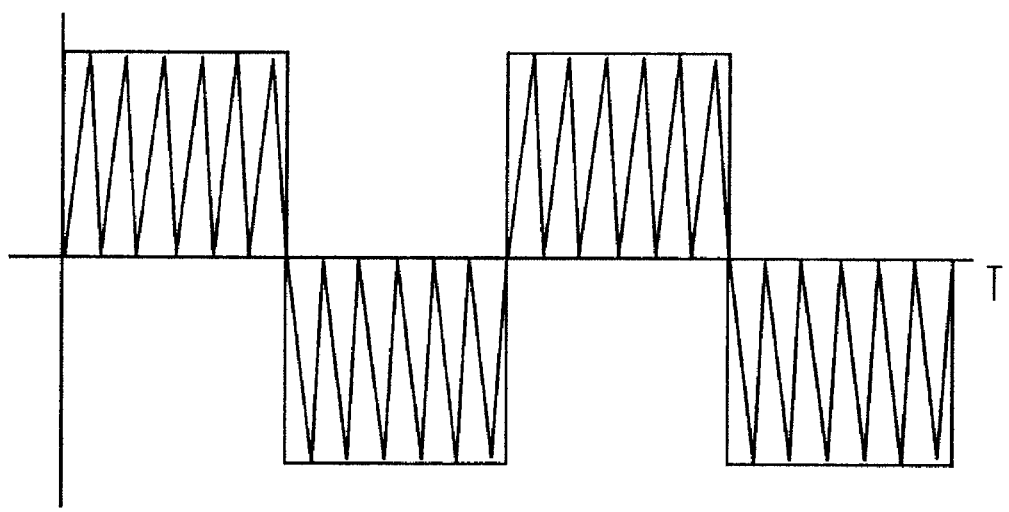
FIG. 7 is a waveform diagram showing in simplified form the load circuit inductor current.

When the output voltage is positive the average value of iL34 is positive. When t10<t<t11 as shown in FIG. 6, M33 is on (switch closed), iL34 is rising so energy is drawn from C35 and some of it is being stored in L34. Immediately after t10, sufficient current is flowing so that transformer Ls1 is saturated, and its secondary looks like a short circuit. When t12<t<t13, M34 is on, iL34 is positive but falling, energy is drawn from L34, and the impedance of Ls1 is sensed to determine when t=t13.

Detailed operation of the output stage is readily understood from the basic timing diagram shown in FIG. 6, together with the views of the active circuit parts and current and voltages near the critical switching times as shown in FIGS. 6a–6d. State 11 begins at time t10 when the upper output switch M33 is turned on. The voltage across L34 is then 0.5*Vbus−Vout. The current iL34 through output inductor L34 ramps linearly upwards for a constant on time until t11 when switch M33 is turned off and the circuit enters state 12. Current iL34 continues to flow, and splits between the switch parasitic capacitances, charging cM33 of switch M33 while discharging the parasitic capacitance cM34 of switch M34, thereby causing the voltage V33 at the node between the switches to fall from the positive bus potential Vbus toward ground. When the node voltage reaches ground, the capacitance cM34 has been discharged, and the body diode of M34 turns on, clamping the node voltage V33 to ground. Switch M34 can then be turned on at zero voltage and the circuit enters state 13.

During state 13 the voltage across L34 is −(0.5*Vbus+Vout). Current iL34 will then ramp downwards linearly. When iL34 reaches zero, as detected by the impedance of Ls1, time t13 has been reached. MOSFET M34 is turned off and the circuit enters state 14.

In state 14 L34, cM33 and cM34 form a resonant circuit. The voltage V33 increases toward a maximum value of Vbus+2*Vout. When V33 reaches Vbus, the body diode of M33 will clamp V33 to Vbus. M33 can then be turned on with true zero voltage switching, starting repetition of the switching cycle.

For the negative half of the output cycle, operation is exactly like that described above, except that the current directions and the operations of the switches reverse. Differing power flows into or out of C35 versus C36 are not significant, because the values of these capacitors is such that the ripple voltage across them at the output frequency is negligible. The output converter controls the load current or voltage by controlling the current value or instant of time at which the output switching device is turned off. As a result, the switching frequency in the input and boost circuits can be different from the switching frequency in the output commutator. This allows control of the output for lamp starting or dimming, or response to removal of the lamp (or one of the lamps) so that lamp current has the desired value, independently of the boost converter frequency.

Time T12 can be determined either as a constant determined from a system clock, or as a clock time or inductor peak current value which is controlled to maintain the average load current at a desired value.

If the load can be driven by DC, or by a pulse width controlled signal where voltage and current do not reverse thus providing an additional way to vary load power, circuit simplification is possible because one output switch and its control circuitry may be eliminated. For example, C35 and C36 may be combined as one higher voltage capacitor, the left end of the load circuit shown in FIG. 3 may be connected to the negative DC bus, and switch M34 may be replaced by a diode poled in the same direction as the body diode of M34.

Many other variations and embodiments may utilize the principle of the inventive circuits, and the scope of the invention should be limited only by the appended claims.

What is claimed is:

1. A high frequency power converter circuit comprising:
   an input stage comprising semiconductor input stage power switching devices, for receiving low frequency power and having a rectified output at a voltage higher than a peak voltage of said low frequency power, and
   a commutator stage comprising at least one semiconductor output power switching device, connected to said rectified output and having an output for coupling to a load,
   characterized in that the converter circuit further comprises means for providing lossless switching of all said power switching devices.

2. The converter circuit claimed in claim 1, characterized in that said input stage has two said input stage power switching devices connected in series between two signal lines,
   said means comprises a capacitive divider and a boost inductor,
   said capacitive divider has a first end connected to one of said signal lines, a second end connected to the other of said signal lines, and an intermediate connection, and
   said boost inductor is connected between said intermediate connection and a node between said two input stage power switching devices.

3. The converter circuit claimed in claim 2, characterized in that said means further comprises a first sensing element for sensing when a current through said boost inductor changes polarity, and a boost control circuit for switching on one of said input stage power switching devices responsive to the change of polarity of boost inductor current.

4. The converter circuit claimed in claim 3, characterized in that the converter further comprises a positive DC bus and a negative DC bus, said at least one output power switching devices being connected between the two buses, and said first sensing element is connected between one of said signal lines and one of said two buses.

5. The converter circuit claimed in claim 4, characterized in that said sensing element is a resistor.

6. The converter circuit claimed in claim 1, characterized in that the converter further comprises a positive DC bus and a negative DC bus to which said rectified output is connected, and the commutator stage comprises:

two said semiconductor output power switching devices connected in series between the two buses, and having an output node between the two power switching devices, and a series circuit comprising a high frequency inductor and load connections, connected between said output node and at least one of said buses, and said means further comprises a sensing device for determining when current through said high frequency inductor is approximately zero.

7. The converter circuit claimed in claim 6, characterized in that said sensing device comprises a saturable inductor, the commutator stage further comprises an output control circuit for switching on one of said output power switching devices responsive to an increase in impedance of said saturable inductor.

8. The converter circuit claimed in claim 7, characterized in that said saturable inductor is part of a saturable transformer having a secondary winding, said secondary winding being connected to said output control circuit.

9. The converter circuit claimed in claim 6, characterized in that said series circuit includes a smoothing capacitor connected between said load connections, and the commutator stage further comprises an output control circuit for controlling switching of said output power switching devices, the output control circuit causing current through said output inductor to flow in one direction for a plurality of switching cycles, and then to flow in the opposite direction for a same plurality of switching cycles, whereby voltage across said smoothing capacitor reverses polarity when the direction of output inductor current flow is reversed.

10. An electronic lamp ballast comprising:

an input stage comprising semiconductor input stage power switching devices, for receiving low frequency power and having a rectified output at a voltage higher than a peak voltage of said low frequency power, and a commutator stage comprising at least one semiconductor output power switching device, connected to said rectified output and having an output for coupling to a lamp, and an output control circuit for controlling switching of said at least one output power switching device at a high frequency, characterized in that the lamp ballast further comprises means for providing lossless switching of all said power switching devices, and a frequency-sensitive network for coupling said output to said lamp substantially free from said high frequency.

11. The lamp ballast claimed in claim 10, characterized in that said input stage has two said input stage power switching devices connected in series between two signal lines, said means comprises a capacitive divider and a boost inductor, said capacitive divider has a first end connected to one of said signal lines, a second end connected to the other of said signal lines, and an intermediate connection, and said boost inductor is connected between said intermediate connection and a node between said two input stage power switching devices.

12. The lamp ballast claimed in claim 11, characterized in that said means further comprises a first sensing element for sensing when a current through said boost inductor changes polarity, and a boost control circuit for switching on one of said input stage power switching devices responsive to the change of polarity of boost inductor current.

13. The lamp ballast claimed in claim 12, characterized in that the converter further comprises a positive DC bus and a negative DC bus, said at least one output power switching device being connected between the two buses, and said first sensing element is connected between one of said signal lines and one of said two buses.

14. The lamp ballast claimed in claim 13, characterized in that said sensing element is a resistor.

15. The lamp ballast claimed in claim 10, characterized in that the converter further comprises a positive DC bus and a negative DC bus to which said rectified output is connected, and the commutator stage comprises:

two said semiconductor output power switching devices connected in series between the two buses, and having an output node between the two power switching devices, and said frequency-sensitive network comprises a high frequency inductor and load connections, connected between said output node and at least one of said buses, and said means further comprises a sensing device for determining when current through said high frequency inductor is approximately zero.

16. The lamp ballast claimed in claim 15, characterized in that said sensing device comprises a saturable inductor, the commutator stage further comprises an output control circuit for switching on one of said output power switching devices responsive to an increase in impedance of said saturable inductor.

17. The lamp ballast claimed in claim 16, characterized in that said saturable inductor is part of a saturable transformer having a secondary winding, said secondary winding being connected to said output control circuit.

18. The lamp ballast claimed in claim 15, characterized in that said frequency-sensitive network includes a smoothing capacitor connected between said load connections, and the commutator stage further comprises an output control circuit for controlling switching of said output power switching devices, the output control circuit causing current through said output inductor to flow in one direction for a plurality of switching cycles, and then to flow in the opposite direction for a same plurality of switching cycles, whereby voltage across said smoothing capacitor and current through the lamp reverse polarity when the direction of output inductor current flow is reversed.

19. The lamp ballast claimed in claim 15, characterized in that said input stage has two said input stage power switching devices connected in series between a negative DC bus and a positive DC bus, said means comprises a capacitive divider and a boost inductor, said capacitive divider has a first end connected to said negative DC bus, a second end connected to said positive DC bus, and an intermediate connection, and said boost inductor is connected between said intermediate connection and a node between said two input stage power switching devices.

20. The lamp ballast claimed in claim 19, characterized in that said frequency-sensitive network includes a smoothing capacitor connected between said load connections, and the commutator stage further comprises an output control circuit for controlling switching of said output power switching devices, the output control circuit causing current through said output inductor to flow in one direction for a plurality of switching cycles, and then to flow in the opposite direction for a same plurality of switching cycles, whereby voltage across said smoothing capacitor and current through the lamp reverse polarity when the direction of output inductor current flow is reversed.

* * * * *